United States Patent
Wu et al.

(10) Patent No.: US 12,155,604 B2
(45) Date of Patent: Nov. 26, 2024

(54) REFERENCE SIGNAL CONFIGURATION (71) Applicant: ZTE Corporation, Guangdong (CN)

(72) Inventors: Hao Wu, Shenzhen (CN); Yu Ngok Li, Shenzhen (CN); Chuangxin Jiang, Shenzhen (CN); Yijian Chen, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/146,042

(22) Filed: Dec. 23, 2022

(65) Prior Publication Data
US 2023/0126742 A1 Apr. 27, 2023

Related U.S. Application Data (63) Continuation of application No. 16/876,043, filed on May 16, 2020, now Pat. No. 11,539,495, which is a continuation of application No. PCT/CN2017/111726, filed on Nov. 17, 2017.

(51) Int. Cl.
*H04L 5/00* (2006.01)
*H04B 7/0456* (2017.01)
*H04B 7/06* (2006.01)

(52) U.S. Cl.
CPC ......... *H04L 5/0092* (2013.01); *H04B 7/0456* (2013.01); *H04B 7/0626* (2013.01); *H04L 5/005* (2013.01)

(58) Field of Classification Search
CPC ..... H04L 5/0092; H04L 5/005; H04B 7/0456; H04B 7/0626
See application file for complete search history.

(56) References Cited

U.S. PATENT DOCUMENTS

| | | | | |
|---|---|---|---|---|
| 11,139,875 | B2 * | 10/2021 | Wei | H04L 1/0026 |
| 2012/0163335 | A1 * | 6/2012 | Chung | H04L 5/0023 370/329 |
| 2014/0044040 | A1 | 2/2014 | Chen et al. | |
| 2015/0078289 | A1 | 3/2015 | Kakishima et al. | |
| 2015/0085692 | A1 | 3/2015 | Wang et al. | |
| 2017/0353222 | A1 * | 12/2017 | Wei | H04B 7/0469 |
| 2018/0041319 | A1 | 2/2018 | Cheng et al. | |
| 2018/0227031 | A1 * | 8/2018 | Guo | H04W 24/10 |
| 2018/0343653 | A1 * | 11/2018 | Guo | H04W 72/542 |

(Continued)

FOREIGN PATENT DOCUMENTS

| | | |
|---|---|---|
| CN | 101771435 A | 7/2010 |
| CN | 102845009 A | 12/2012 |

(Continued)

OTHER PUBLICATIONS

CATT, "Discussion on DL beam management," 3GPP TSG RAN WG1 Meeting #89, Hangzhou, China, R1-1707475, May 2017.

(Continued)

*Primary Examiner* — Sophia Vlahos
(74) *Attorney, Agent, or Firm* — Perkins Coie LLP (57) ABSTRACT

Methods, systems, and devices are described for reference signal configuration in wireless communication. In one exemplary aspect, a method for wireless communication is disclosed. The method includes receiving one or more signaling that indicates selection of reference signal resources, cell and/or BWP information, and receiving at least one reference signal based thereon.

12 Claims, 5 Drawing Sheets

(56) References Cited

U.S. PATENT DOCUMENTS

| | | | | |
|---|---|---|---|---|
| 2018/0368088 | A1* | 12/2018 | Nagaraja | H04W 72/0446 |
| 2019/0053288 | A1* | 2/2019 | Zhou | H04B 7/0626 |
| 2019/0081679 | A1* | 3/2019 | Davydov | H04W 72/23 |
| 2020/0267571 | A1* | 8/2020 | Park | H04L 5/0051 |
| 2020/0280425 | A1 | 9/2020 | Wu et al. | |

FOREIGN PATENT DOCUMENTS

| | | |
|---|---|---|
| CN | 104981989 A | 10/2015 |
| CN | 105659508 A | 6/2016 |
| CN | 105940634 A | 9/2016 |

OTHER PUBLICATIONS

Ericsson, "RRC configuration for CSI-MeasConfig," 3GPP TSG-RAN WG2 Meeting #100 on NR, Reno, Nevada, R2-1713738, Dec. 2017.
Extended European Search Report for European Patent Application No. 17932234.2, mailed May 10, 2021.
First Examination Report for Indian Patent Application No. 202047022310, mailed Jan. 20, 2022 (5 pages).
International Search Report and Written Opinion mailed on Aug. 8, 2018 for International Application No. PCT/CN2017/111726, filed on Nov. 17, 2017 (7 pages).
LG Electronics, "Discussion on DU/UL beam management," 3GPP TSG RAN WG1 Meeting #90-bis, Prague, Czechia, R1-1717941, Oct. 2017.
Li, Xiao-wen et al., "Research of de-resource mapping algorithm for PDCCH based on transmit diversity signal detection in LTE system," Application Research of Computers, vol. 30 No. 10, Oct. 2013 (5 pages).
Nokia, "Remaining details on QCL," 3GPP TSG RAN WG1 Meeting #90bis, Prague, Czech Republic, R1-1718769, Oct. 2017.
Office Action for Chinese Patent Application No. 201780096968.0, mailed Feb. 8, 2021.
Office Action for Chinese Patent Application No. 202111220721.X, mailed Jun. 21, 2022 (15 pages).
Office Action for Japanese Patent Application No. 2020-527027, mailed Aug. 3, 2021, with English summary (7 pages).
Office Action for Japanese Patent Application No. 2020-527027, mailed Apr. 5, 2022, with English summary (5 pages).
Office Action for Korean Patent Application No. 10-2020-7017307, mailed May 12, 2022, with English summary (8 pages).
Qualcomm Incorporated, "Details of CSI framework," 3GPP TSG RAN WG1 #90, Prague, Czech, R1-1713393, Aug. 2017.
Qualcomm, "Discussion on QCL," 3GPP TSG RAN WG1 NR Ad-Hoc#2, Qingdao, China, R1-1711176, Jun. 2017.
Samsung, "On Beam Management, Measurement and Reporting," 3GPP TSG RAN WG1 NR AH#3, Nagoya, Japan, R1-1715940, Sep. 2017.
Texas Instruments, "Common Reference Symbol Mapping/Signaling for 8 Transmit Antenna," 3GPP TSG RAN1 #55, R1-084447, Prague, Czech Republic, Nov. 2008 (6 pages).
Xinwei, "Further Discussion on CSI Framework Details," 3GPP TSG RAN WG1 #88, Athens, Greece, R1-1702023, Feb. 2017.

Zte et al., "Details and evaluation results on beam indication," 3GPP TSG RAN WG1 Meeting #90-bis, Prague, Czechia, R1-1717429, Oct. 2017.
ZTE et al., "Remaining details on TRS," 3GPP TSG RAN WG1 Meeting NR#3, Nagoya, Japan, R1-1715452, Sep. 2017.
Office Action for Korean Patent Application No. 10-2020-7017307, mailed Jan. 16, 2023, with English summary (5 pages).
LG Electronics et al., "WF on CSI timing for NR," 3GPP TSG RAN1 #87, R1-1613431, Reno, USA, Nov. 14-18, 2016.
Nokia et al., "On the CSI timing relationships," 3GPP TSG RAN WG1 Meeting #88, R1-1703171, Athens, Greece Feb. 13-17, 2017.
Lg Electronics et al., "WF on CSI timing," 3GPP TSG RAN1 #89, R1-1709396, Hangzhou, P.R. China, May 15-19, 2017.
Qualcomm, "Summary of Beam Mgmt open issues," 3GPP TSG RAN WG1 Meeting #91, R1-1721396, Reno, USA, Nov. 27-Dec. 1, 2017.
Qualcomm, "Summary of Beam Mgmt.," 3GPP TSG RAN WG1 Meeting #91, R1-1721640, Reno, USA, Nov. 27-Dec. 1, 2017.
Qualcomm, "Summary of Beam Mgmt.," 3GPP TSG RAN WG1 Meeting #91, R1-1721696, Reno, USA, Nov. 27th-Dec. 1, 2017.
3GPP, "Technical Specification Group Radio Access Network; NR; Physical layer procedures for data (Release 15)," 3GPP TS 38.214 V1.0.0 (Sep. 2017).
U.S. Appl. No. 62/598,203, filed Dec. 13, 2017 (24 pages).
Listserv- 3GPP_TSG_RAN_WG1 Archives, list.etsi.org (33 pages).
Communication pursuant to Article 94(3) EPC for European Patent Application No. 17932234.2, mailed May 31, 2023 (5 pages).
Office Action for Korean Patent Application No. 10-2023-7013058, mailed Dec. 11, 2023, with English summary (7 pages).
Ericsson et al., "WF on defining frequency-granularities for CSI reporting and CSI-RS," 3GPP TSG RAN WG1 Meeting #90, R1-1715045, Agenda item 6.1.2.2.3, Prague, Czech Republic, Aug. 21-25, 2017 (4 pages).
Ericsson, "Partial band CSI reporting," 3GPP TSG-RAN WG1 NR Ad Hoc #3, R1-1716360, Nagoya, Japan, Sep. 18-21, 2017 (6 pages).
Samsung, "CSI Acquisition and Beam Management Framework," 3GPP TSG RAN WG1 Meeting #90, R1-1713586, Prague, P.R. Czechia Aug. 21-25, 2017 (4 pages).
Xinwei, "Discussion on CSI Framework and Aperiodic CSI-RS Resources and Reports Activation," 3GPP TSG-RAN WG1 #89, R1-1707086, Hangzhou, China, May 15-19, 2017 (5 pages).
Qualcomm, "Beam management offline discussion summary," 3GPP TSG-RAN WG1 #90bis, R1-1718920, Prague, Czechia, Oct. 9-13, 2017 (4 pages).
Samsung, "Discussion on beam indication for PDSCH," 3GPP TSG RAN WG1 Meeting #90bis, R1-1717612, Prague, Czech, Oct. 9-13, 2017 (5 pages).
Ericsson, "Summary of views on CSI reporting (agenda item 7.2.2.2)," 3GPP TSG-RAN WG1 #90bis, R1-1718956, Prague, Czech Republic, Oct. 9-13, 2017 (7 pages).
Huawei et al., "Remaining details on CSI-RS design in NR," 3GPP TSG RAN WG1 Meeting #91, R1-1719438, Reno, USA, Nov. 27-Dec. 1, 2017 (12 pages).
Notice of Allowance for Korean Patent Application No. 10-2023-7013058, mailed Aug. 2, 2024 (8 pages).

* cited by examiner

FIG. 1

Reference Signal Resource Configuration
{...,
Cell Indicator(s), and/or, BWP Indicators(s)
}

FIG. 2

Reference Signal Resource Set Configuration
{Reference Signal Resource Indicator 1, ...,
Reference Signal Resource Indicator K, ...,
Cell Indicator(s), and/or, BWP Indicators(s)
}

Reference Signal Resource Subset Configuration
{Reference Signal Resource Indicator 1, ...,
Reference Signal Resource Indicator M, ...,
Cell Indicator(s), and/or, BWP Indicators(s)
}

REFERENCE SIGNAL CONFIGURATION

CROSS REFERENCE TO RELATED APPLICATIONS

This patent document is a continuation of and claims benefit of priority to U.S. patent application Ser. No. 16/876,043, filed May 16, 2020, which is a continuation of International Patent Application No. PCT/CN2017/111726, filed on Nov. 17, 2017. The entire content of the before-mentioned patent applications is incorporated by reference as part of the disclosure of this application.

TECHNICAL FIELD

This patent document is directed generally to wireless communications.

BACKGROUND

The mobile communication technologies are moving the world toward an increasingly connected and networked society. In comparison with the existing wireless networks, the next generation systems and wireless communication techniques will need to support a much wider range of use-case characteristics and provide a much more complex range of network access techniques.

SUMMARY OF PARTICULAR EMBODIMENTS

This patent document relates to techniques, systems, and devices for reference signal configuration in wireless communications.

In one exemplary aspect, a method for wireless communication is disclosed. The method includes receiving first signaling that indicates one or more sets of reference signal resources, and receiving second signaling that indicates a selection, of (1) one or more subsets of reference signal resources or (2) one or more individual reference signal resources, from the one or more sets of reference signal resources.

In some embodiments, configuration information of each individual reference signal resource includes at least one indicator of a cell and/or bandwidth part (BWP) associated with the individual reference signal resource. In some embodiments, configuration information of each individual set or subset of reference signal resources includes at least one indicator of a cell and/or BWP associated with the individual set or subset of reference signal resources.

In some embodiments, the method further includes selecting one or more candidate sets of cell indicators and/or BWP indicators based, at least in part, on third signaling. In some embodiments, the method further includes receiving fourth signaling that indicates a selection of one or more target cells or target BWPs based, at least in part, on the one or more candidate sets of cell indicators and/or BWP indicators. In some embodiments, wherein at least one reference signal is received on the one or more target cells or target BWPs. In some embodiments, the at least one reference signal is received based, at least in part, on at least one reference signal resource or reference signal resource subset corresponding to the one or more target cells or target BWPs.

In some embodiments, wherein the method further includes receiving fifth signaling that indicates one or more candidate groups of reference signal resource sets and/or subsets. In some embodiments, the method further includes receiving sixth signaling that indicates a selection of one or more target groups of reference signal resource sets and/or subsets from the one or more candidate groups of reference signal resource sets and/or subsets. In some embodiments, the method further includes receiving at least one reference signal based, at least in part, on the selected one or more target groups of reference signal resource sets and/or subsets. In some embodiments, the method further includes determining a per-set or per-subset time gap between a slot for receiving of at least one reference signal and a slot for triggering the at least one reference signal with respect to at least one reference signal resource set or subset included in the selected one or more target groups based, at least in part, on signaling from a wireless communication device and/or one or more predefined rules.

In some embodiments, the method further includes receiving seventh signaling that indicates information regarding one or more cells and/or BWPs associated with channel state information (CSI) reporting. In some embodiments, one or more cells and/or BWPs configured in channel state information (CSI) setting correspond to a subset of one or more cells and/or BWPs configured in reference signal resource setting.

In some embodiments, the method further includes determining at least one of (1) one or more cells and/or BWPs for CSI reporting, (2) one or more subband sizes for CSI reporting, or (3) one or more frequency-domain locations of one or more corresponding subband(s) associated with the CSI reporting based, at least in part, on one or more cells and/or BWPs configured in reference signal resource setting.

In some embodiments, a time gap between a slot for receiving at least one reference signal and a slot for triggering the at least one reference signal is determined based, at least in part, on the existence and/or the value of at least one spatial QCL parameter corresponding to the (1) one or more subsets of reference signal resources or (2) one or more individual reference signal resources.

In some embodiments, (1) if a control signaling format of a signaling that triggers the at least one reference signal satisfies first criteria, a slot for receiving the at least one reference signal and a slot for triggering the at least one reference signal are a same slot, and/or (2) if the control signaling format of the signaling that triggers the at least one reference signal does not satisfy the first criteria, a time gap between a slot for receiving the at least one reference signal and a slot for triggering the at least one reference signal is determined based, at least in part, on signaling from a wireless communication node and/or one or more predefined rules. In some embodiments, the first criteria includes at least one of (1) the control signaling format excludes the at least one spatial QCL parameter, (2) the at least one spatial QCL parameter is the same as at least one default spatial QCL parameter, or (3) the at least one spatial QCL parameter is the same as at least one spatial QCL parameter configured by high layer signaling. In some embodiments, the control signaling format of the signaling that triggers the at least one reference signal does not satisfy the first criteria and wherein (1) indication information for the time gap between the slot for receiving the at least one reference signal and the slot for triggering the at least one reference signal and (2) indication information for the at least one spatial QCL parameter are jointly indicated. In some embodiments, the control signaling format of the signaling that triggers the at least one reference signal does not satisfy the first criteria, wherein the slot for receiving the at least one reference signal is a Tth slot after the slot for triggering the at least one reference signal, and wherein T is an integer larger than 0. In some embodiments, (1) T is a fixed value, (2) T is determined based at least in part on a UE capability, or (3) T is determined based at least in part on signaling from a wireless communication node.

In some embodiments, configuration information of at least one reference signal resource includes information indicating at least one QCL parameter and wherein N ports included in the at least one reference signal resource are divided into D port groups based, at least in part, on the information indicating the at least one QCL parameter. In some embodiments, ports having port indices separated by M are included in a same port group, wherein M is at least one of: (1) N/2, (2) N/K, wherein K is a number of CDM groups included in the at least one reference signal resource, (3) a value determined based at least in part on signaling from a wireless communication node, or (4) a number of ports included in each CDM group. In some embodiments, M is determined based at least in part on signaling from a wireless communication node and M is determined based, at least in part, on at least one associated codebook configuration parameter. In some embodiments, ports having consecutive S port indices are included in a same port group, wherein S is at least one of: (1) N/2, (2) N/K, wherein K is a number of CDM groups included in the at least one reference signal resource, (3) a value determined based at least in part on signaling from a wireless communication node, or (4) a number of ports included in each CDM group. In some embodiments, S is determined based at least in part on signaling from a wireless communication node and S is determined based at least in part on at least one associated codebook configuration parameter. In some embodiments, ports associated with a same symbol or symbol group are included in a same port group. In some embodiments, ports associated with a same component or component group are included in a same port group.

In another exemplary aspect, a method for wireless communication is disclosed. The method includes transmitting first signaling that indicates one or more sets of reference signal resources, and transmitting second signaling that indicates a selection, of (1) one or more subsets of reference signal resources or (2) one or more individual reference signal resources, from the one or more sets of reference signal resources.

In some embodiments, configuration information of each individual reference signal resource includes at least one indicator of a cell and/or bandwidth part (BWP) associated with the individual reference signal resource. In some embodiments, configuration information of each individual set or subset of reference signal resources includes at least one indicator of a cell and/or BWP associated with the individual set or subset of reference signal resources.

In some embodiments, the method further includes transmitting third signaling that indicates a selection of one or more candidate sets of cell indicators and/or BWP indicators. In some embodiments, the method further includes transmitting fourth signaling that indicates a selection of one or more target cells or target BWPs based, at least in part, on the one or more candidate sets of cell indicators and/or BWP indicators. In some embodiments, the method further includes transmitting at least one reference signal on the one or more target cells or target BWPs. In some embodiments, the at least one reference signal is transmitted based, at least in part, on at least one reference signal resource or reference signal resource subset corresponding to the one or more target cells or target BWPs.

In some embodiments, the method further includes transmitting fifth signaling that indicates one or more candidate groups of reference signal resource sets and/or subsets. In some embodiments, the method further includes transmitting sixth signaling that indicates a selection of one or more target groups of reference signal resource sets and/or subsets from the one or more candidate groups of reference signal resource sets and/or subsets. In some embodiments, the method further includes transmitting at least one reference signal based, at least in part, on the selected one or more target groups of reference signal resource sets and/or subsets. In some embodiments, the method further includes transmitting information regarding a per-set or per-subset time gap between a slot for transmission of the at least one reference signal and a slot for triggering the at least one reference signal with respect to at least one reference signal resource set or subset included in the selected one or more target groups based, at least in part, on signaling and/or one or more predefined rules.

In some embodiments, the method further includes transmitting seventh signaling that indicates information regarding one or more cells and/or BWPs associated with channel state information (CSI) reporting. In some embodiments, one or more cells and/or BWPs configured in channel state information (CSI) setting correspond to a subset of one or more cells and/or BWPs configured in reference signal resource setting. In some embodiments, the method further includes receiving CSI reporting from a wireless communication node, wherein at least one of (1) one or more cells and/or BWPs for the CSI reporting, (2) one or more subband sizes for the CSI reporting, or (3) one or more frequency-domain locations of one or more corresponding subband(s) associated with the CSI reporting is determined based, at least in part, on one or more cells and/or BWPs configured in reference signal resource setting.

In some embodiments, a time gap between a slot for transmission of at least one reference signal and a slot for triggering the at least one reference signal is determined based, at least in part, on the existence and/or the value of at least one spatial QCL parameter corresponding to the (1) one or more subsets of reference signal resources or (2) one or more individual reference signal resources. In some embodiments, (1) if a control signaling format of a signaling that triggers the at least one reference signal satisfies first criteria, a slot for transmission of the at least one reference signal and a slot for triggering the at least one reference signal are a same slot, and/or (2) if the control signaling format of the signaling that triggers the at least one reference signal does not satisfy the first criteria, a time gap between a slot for transmission of the at least one reference signal and a slot for triggering the at least one reference signal is determined based, at least in part, on signaling and/or one or more predefined rules. In some embodiments, the first criteria includes at least one of (1) the control signaling format excludes the at least one spatial QCL parameter, (2) the at least one spatial QCL parameter is the same as at least one default spatial QCL parameter, or (3) the at least one spatial QCL parameter is the same as at least one spatial QCL parameter configured by high layer signaling. In some embodiments, the control signaling format of the signaling that triggers the at least one reference signal does not satisfy the first criteria and wherein (1) indication information for the time gap between the slot for transmission of the at least one reference signal and the slot for triggering the at least one reference signal and (2) indication information for the at least one spatial QCL parameter are jointly indicated. In some embodiments, the control signaling format of the signaling that triggers the at least one reference signal does not satisfy the first criteria, wherein the slot for transmission of the at least one reference signal is a Tth slot after the slot for triggering the at least one reference signal, and wherein T is an integer larger than 0. In some embodiments, (1) T is a fixed value, (2) T is determined based at least in part on a UE capability, or (3) T is indicated to a wireless communication node based, at least in part, on signaling.

In some embodiments, configuration information of at least one reference signal resource includes information indicating at least one QCL parameter and wherein N ports included in the at least one reference signal resource are divided into D port groups based, at least in part, on the information indicating the at least one QCL parameter. In some embodiments, ports having port indices separated by M are included in a same port group, wherein M is at least one of: (1) N/2, (2) N/K, wherein K is a number of CDM groups included in the at least one reference signal resource, (3) a value determined based at least in part on signaling, or (4) a number of ports included in each CDM group. In some embodiments, M is determined based at least in part on signaling and M is determined based, at least in part, on at least one associated codebook configuration parameter. In some embodiments, ports having consecutive S port indices are included in a same port group, wherein S is at least one of: (1) N/2, (2) N/K, wherein K is a number of CDM groups included in the at least one reference signal resource, (3) a value determined based at least in part on signaling, or (4) a number of ports included in each CDM group. In some embodiments, S is determined based at least in part on signaling and S is determined based at least in part on at least one associated codebook configuration parameter. In some embodiments, ports associated with a same symbol or symbol group are included in a same port group. In some embodiments, ports associated with a same component or component group are included in a same port group.

In another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

The rapid growth of wireless communications and advances in technology is partly to satisfy the demand for greater capacity and higher data rates. Other aspects, such as energy consumption, device cost, spectrum resource allocation, and latency are also factors in the success of future networks.

To achieve higher data transfer rate in wireless communications, wireless communication nodes can use multiple antennas to send and/or receive data. Multiple-input and multiple-output (MIMO) is a method for multiplying the capacity of a radio link using multiple transmitting and receiving antennas to exploit multipath propagation. MIMO can use some features of the communication channel to form a multi-layer transmission that matches the channel characteristics, so as to effectively improve communication system performance without increasing the bandwidth and/or power consumption.

Illustratively, a transmitting end sends a reference signal via a channel, and a receiving end calculates the channel state information (CSI) by measuring the received reference signal and feeds back the CSI via the channel to the transmitting end, which can perform precoding or beamforming that matches corresponding channel characteristics. In some embodiments, transmission of a reference signal is not periodic. That is, the transmitting end triggers (or activates) the transmission of the reference signal by signaling, and the receiving end receives and measures the reference signal according to the signaling, and reports CSI. Specifically, the transmit end configures reference signal resource set(s) that are available for selection via first signaling, and indicates selection of reference signal resource(s) or reference signal resource subset(s) from the reference signal resource set(s) via second signaling. The transmitting end triggers transmission of reference signal(s) using the selected reference signal resource(s) or reference signal resource subset(s). The receiving end receives the first and second signaling, and based thereon, the receiving end receives corresponding reference signal(s), takes measurements, and reports CSI.

In the 5G wireless communication technology, a transmitting end can perform data transmission in multiple cells, multiple bandwidth parts (BWPs), and/or multiple spatial quasi-co-location (QCL) parameters. Accordingly, it is desirable for the transmitting end to transmit reference signals in multiple cells, multiple BWPs, and/or multiple spatial QCL parameters to obtain corresponding CSIs. Therefore, more resources for the reference signal may need to be transmitted, the triggering of reference signals can lead to a larger signaling overhead, and in some cases, the timing relationship between the trigger signaling and the reference signal transmission may need redesigning. The presently disclosed technology addresses these issues.

Figure 1:
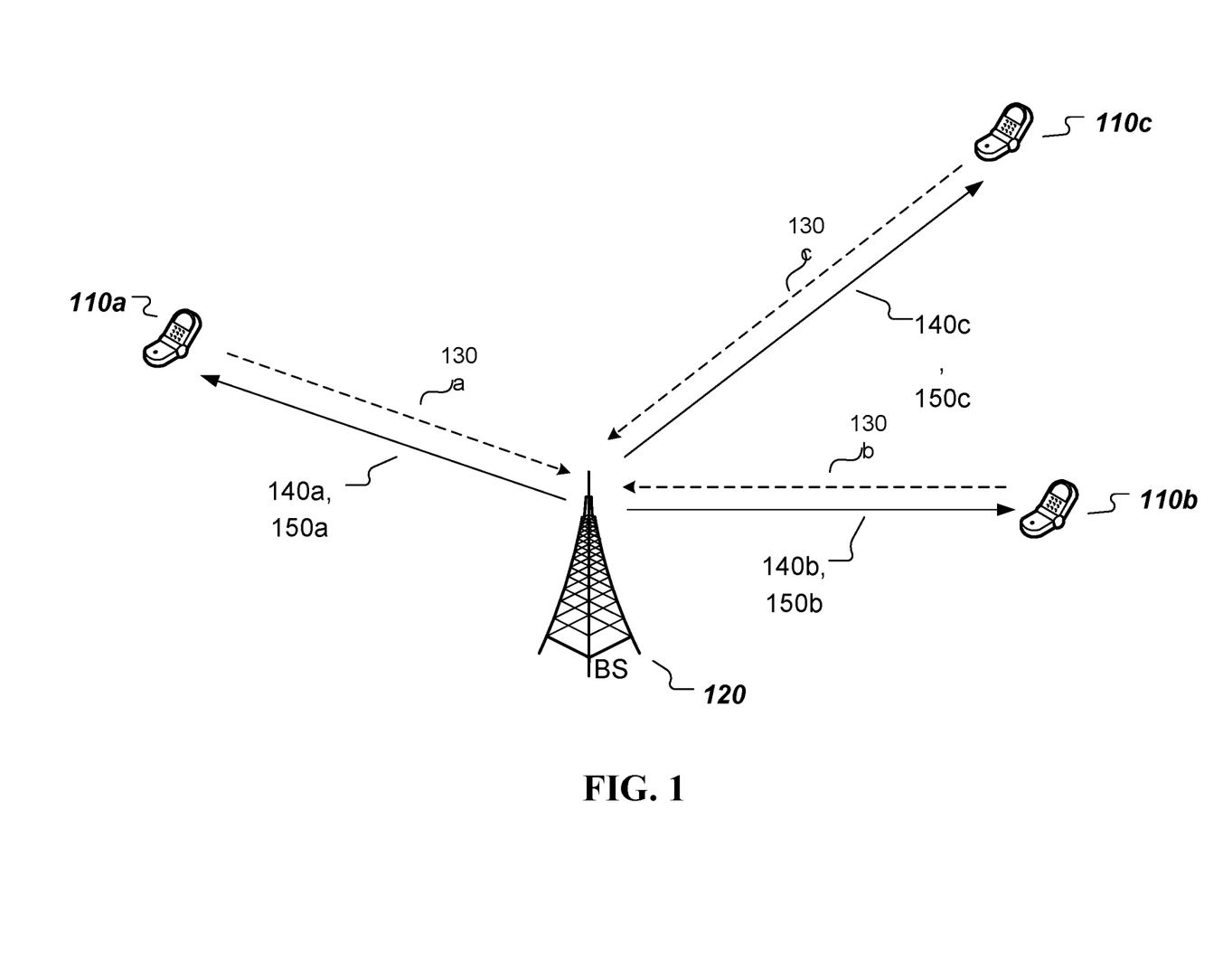
FIG. 1 shows an example of a base station and UEs in wireless communication, in accordance with some embodiments of the presently disclosed technology.

FIG. 1 shows an example of a base station and UEs in wireless communication, in accordance with some embodiments of the presently disclosed technology. The base station (120) can transmit signaling (140a-140c) and reference signals (150a-150c) to the plurality of UEs (110a-110c). The UEs (110a-110c) can transmit corresponding CSIs (130a-130c) to the base station (120). The presently disclosed technology provides various embodiments of reference signal configuration, related signaling, and corresponding CSI transmission in wireless communications between the base station and the UEs.

First Embodiment

Reference signal transmission can be performed in various ways. In cases of periodic reference signal transmission, a base station configures the period and the time offset for sending a reference signal through high layer signaling, and a UE receives a reference signal at a time point determined from the period and time offset information. In cases of triggered reference signal transmission, a base station configures selectable reference signal resource(s) through higher layer signaling, and triggers transmission of the reference signal via base station signaling.

For triggered reference signal transmission, the base station can configure reference signal resource set(s) by using first signaling, where the first signaling is generally high layer signaling. The base station can select reference signal resource(s) and/or reference signal resource subset(s) from the configured reference signal resource set(s) by using second signaling. The UE can receives a reference signal using the selected reference signal resource(s) and/or reference signal resources subset(s). Illustratively, the second signaling can be Layer 1 (L1) signaling, Layer 2 (L2) signaling, or a combination of L1 signaling and L2 signaling. For example, L2 signaling can indicate a selection of a first subset of reference signal resources from the configured reference signal resource set(s), and then L1 signaling can indicate a further selection of a second subset of reference signal resources from the first subset. The UE can receive the reference signal using reference signal resource(s) included in the second subset.

In a New Radio (NR) communication system, multiple cells (e.g., cells in carrier aggregation) can exist. Illustratively, a cell can correspond to a component carrier (CC) or a group of CCs with one or more BWPs. Different cells or BWPs can have different reference signal resource requirements, thus it is desirable for the configuration of reference signal(s) to reflect corresponding cell(s) and/or BWP(s). When more cells and/or BWPs are considered, more reference signal resources and/or reference signal resource subsets need to be configured, which can lead to greater L1/L2 signaling overhead. The presently disclosed technology includes the following methods to address these problems.

Figure 2:
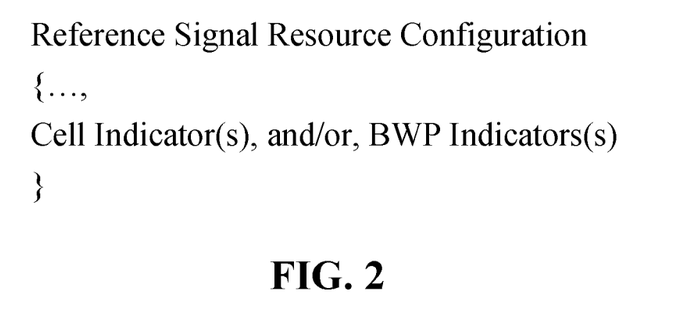
FIG. 2 shows an example of reference signal resource configuration information that includes cell indicator(s) or BWP indicator(s), in accordance with some embodiments of the presently disclosed technology.

In some embodiments, configuration information of each individual reference signal resource can include cell or BWP information associated with the reference signal resource. FIG. 2 shows an example of reference signal resource configuration that includes cell indicator(s) or BWP indicator(s), in accordance with some embodiments of the presently disclosed technology.

Figure 3:
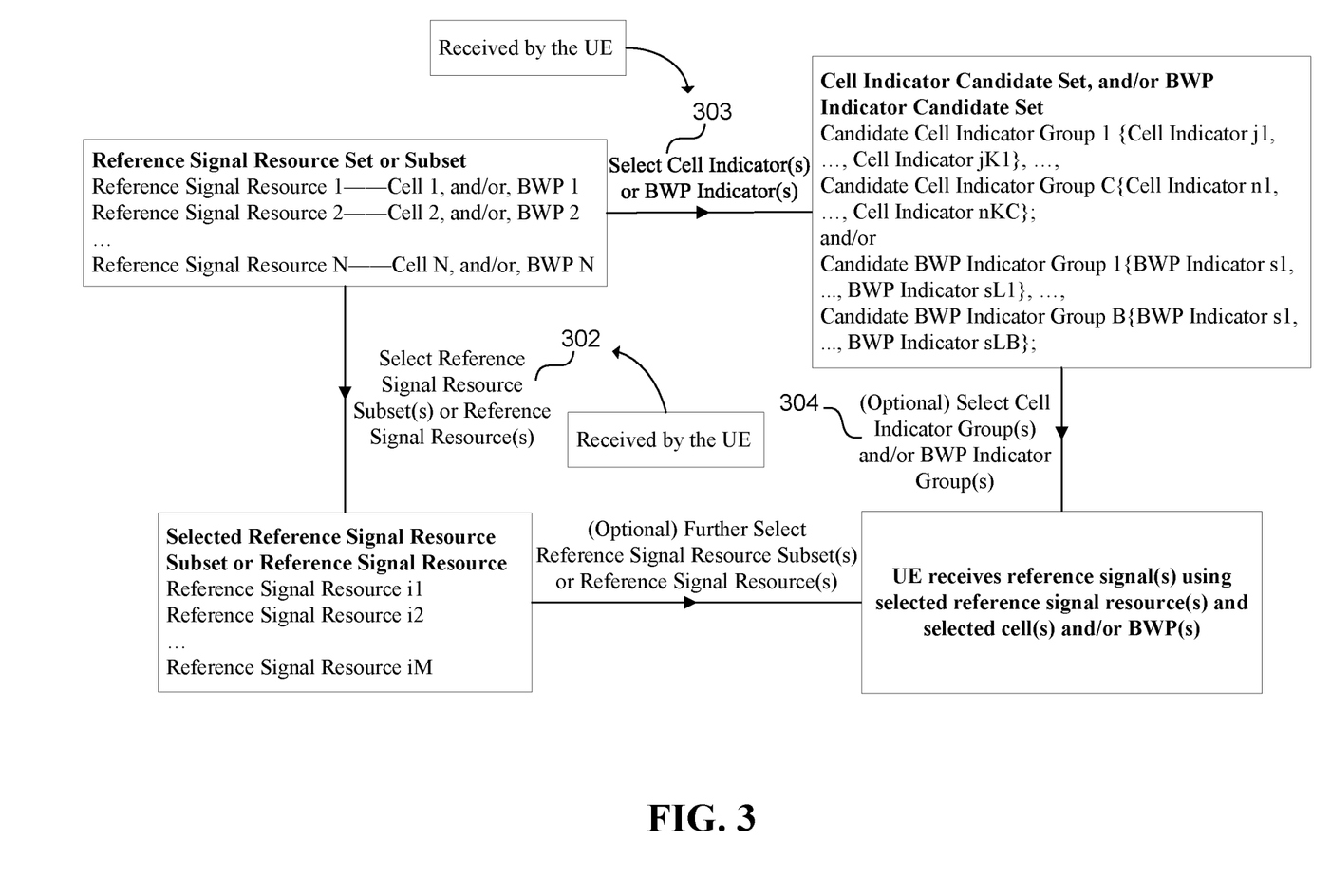
FIG. 3 shows an example of selecting one or more reference signal resources, cells, and/or BWPs based on reference signal resource configuration, in accordance with some embodiments of the presently disclosed technology.

In this way, each reference signal resource configuration includes corresponding cell indicator(s) and/or BWP indicator(s). When selecting a reference signal resource or a reference signal resource subset by using the second signaling, the base station can select cell(s) or BWP(s) by using signaling. FIG. 3 shows an example of selecting one or more reference signal resources, cells, and/or BWPs based on reference signal resource configuration, in accordance with some embodiments of the presently disclosed technology.

Illustratively, as discussed above, the base station can select reference signal resource(s) and/or reference signal resource subset(s) from configured reference signal resource set(s) or subset(s) by using second signaling 302. The base station can also select candidate cell indicator group(s) and/or candidate BWP indicator group(s) based on configuration information of individual reference signal resources using third signaling 303. In some embodiments, the third signaling is L2 signaling.

In some embodiments, the base station can optionally further select cell indicator group(s) and/or BWP indicator group(s) from the candidate group(s) using fourth signaling 304. Each selected cell indicator group can include one or more cell indicators, and each selected BWP indicator group can include one or more BWP indicators. In some embodiments, the fourth signaling is L2 signaling or L1 signaling.

The UE can receive reference signal(s) on selected cell(s) and/or BWP(s). Further, the UE can receive reference signal(s) on the selected cell(s) and/or BWP(s) using their associated reference signal resource(s). In some embodiments, the UE only receives reference signals both (1) on the selected cell(s) and/or BWP(s) and (2) using selected reference signal resource(s). In other words, if a selected reference signal resource is not associated with any selected cell or BWP, then the UE does not use the resource to receive reference signal. Also, if a selected cell or BWP is not associated with any selected reference signal resource, then the UE does not receive reference signal on the cell or BWP.

In some embodiments, the UE can determine frequency domain information (e.g., the maximum bandwidth, the frequency domain granularity of partial bandwidth configuration, or the like) of the selected reference signal resource(s) based on the selected cell and/or BWP information and the reference signal resources included in the selected reference signal resource subset.

Figure 4:
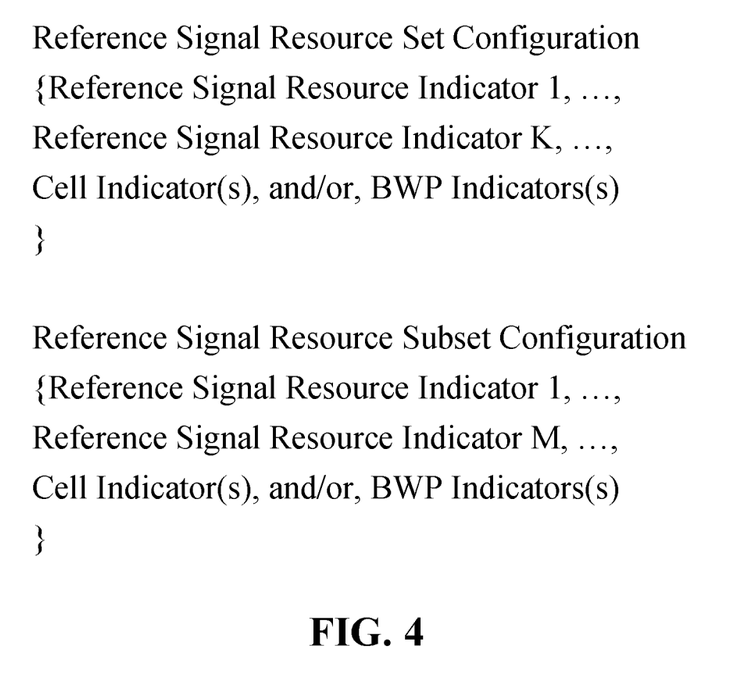
FIG. 4 shows an example of reference signal resource set (or subset) configuration information that includes cell indicator(s) or BWP indicator(s), in accordance with some embodiments of the presently disclosed technology.

In some embodiments, configuration information of each reference signal resource set and/or subset can include associated cell or BWP information. FIG. 4 shows an example of reference signal resource set (or subset) configuration that includes cell indicator(s) or BWP indicator(s), in accordance with some embodiments of the presently disclosed technology. Illustratively, when configuring multiple reference signal resource sets, each set can include one or more corresponding cell indicator(s) and/or one or more corresponding BWP indicators. Alternatively or in addition, when configuring multiple reference signal resource subsets, each reference signal resource subset can include one or more corresponding cell indicator(s) and/or one or more corresponding BWP indicators. For example, different reference signal resource sets can each correspond to a different cell, and within each set, different reference signal resource subsets can each correspond to a different BWP.

Accordingly, when the base station indicates a reference signal resource subset through the second signaling, the base station can indicate a first subset through L2 signaling. The first subset can include reference signal resource subsets within multiple, different reference signal resource sets. In this case, corresponding reference signal resource set and/or subset configuration information can include multiple cell indicators and/or BWP indicators. Similar to the cell and/or BWP selection as discussed above, the base station can select, using third signaling, one or more candidate cell indicator groups and/or one or more candidate BWP indicator groups. In some embodiments, the base station can further select cell(s) and/or BWP(s) from the foregoing candidate group(s) by using fourth signaling. Illustratively, the third signaling can be L1 signaling and/or L2 signaling, and the fourth signaling can be L1 signaling.

The UE can receive reference signal(s) on selected cell(s) and/or BWP(s). Further, the UE can receive reference signal(s) on the selected cell(s) and/or BWP(s) using their associated reference signal resource(s). In some embodiments, the UE only receives reference signals both (1) on the selected cell(s) and/or BWP(s) and (2) using selected reference signal resource(s). In other words, if a selected reference signal resource is not associated with a selected cell or BWP, then the UE does not use the resource to receive reference signal. Also, if a selected cell or BWP is not associated with a selected reference signal resource, then the UE does not receive reference signal on the cell or BWP.

In some embodiments, the UE can determine frequency domain information (e.g., the maximum bandwidth, the frequency domain granularity of partial bandwidth configuration, or the like) of the selected reference signal resource(s) based on the selected cell and/or BWP information and the reference signal resources included in the selected reference signal resource subset.

Second Embodiment

For triggered reference signal transmission, the base station can configure reference signal resource set(s) by using the first signaling, where the first signaling is generally high layer signaling. The base station can select reference signal resource(s) and/or reference signal resource subset(s) from the configured reference signal resource set(s) by using the second signaling. The UE can receive a reference signal using the selected reference signal resource(s) and/or reference signal resources subset(s). Illustratively, the second signaling can be L1 signaling, L2 signaling, or a combination of L1 signaling and L2 signaling. For example, L2 signaling can indicate a selection of a first subset of reference signal resources from the configured reference signal resource set(s), and then L1 signaling can indicate a further selection of a second subset of reference signal resources from the first subset. The UE can receives the reference signal using reference signal resource(s) included in the second subset.

Figure 5:
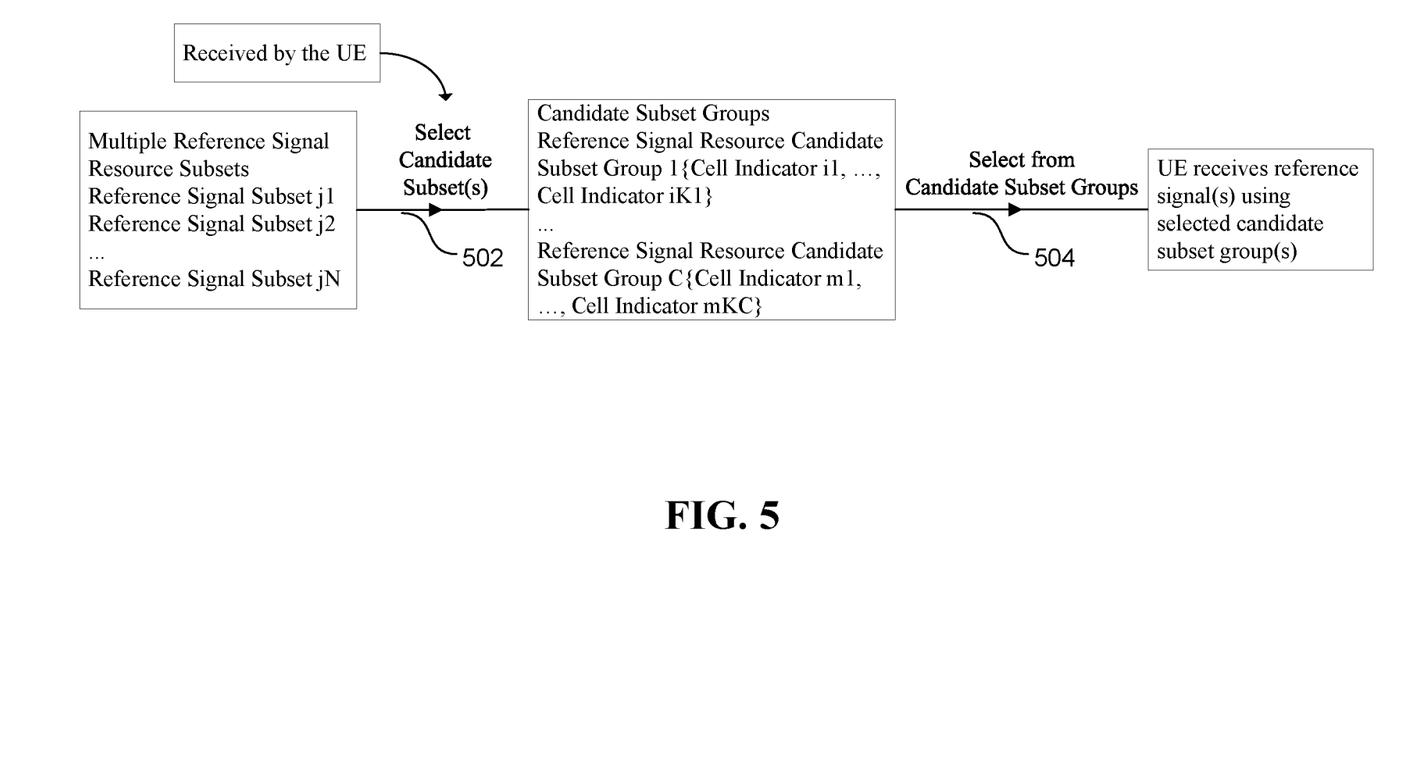
FIG. 5 shows an example of a method for triggering one or more reference signal resource subsets, in accordance with some embodiments of the presently disclosed technology.

When the base station needs to trigger multiple reference signal resource sets or reference signal resource subsets at a time, the base station can achieve it via signaling notification. FIG. 5 shows an example of a method for triggering one or more reference signal resource subsets, in accordance with some embodiments of the presently disclosed technology.

Illustratively, the base station uses signaling 502 to select, from a plurality of reference signal resource subsets, a number of reference signal resource subsets to form one or more candidate groups of reference signal resource subsets. For example, N reference signal resource subsets can be configured with one or more N-bit bitmaps, and reference signal resource subsets that correspond to value "1" in the bitmap(s) are included in corresponding candidate subset group(s) while reference signal resource subsets that correspond to value "0" in the bitmap(s) are filtered out. The signaling 502 can be high layer signaling, such as Layer 3 (L3) signaling and/or L2 signaling. In some embodiments, the signaling can be a combination of L3 signaling and L2 signaling. For example, L N-bit bitmaps are indicated in L3 to form L candidate groups of reference signal resource subsets. L2 signaling is used to select M candidate group of reference signal resource sets from the L candidate groups of reference signal resource subsets indicated in the L3 signaling. In some embodiments, this L2 signaling maps the associated L1 signaling states (e.g., codepoints), if any, to a subset of the L candidate groups of reference signal resource subsets indicated in the L3 signaling.

The base station can notify the UE by another signaling 504, to further select final reference signal resource subset group(s) from the candidate subset group(s). The signaling 504 can be L2 signaling or L1 signaling. The UE can receive reference signal(s) using reference signal resource(s) corresponding to the selected final reference signal resource subset group(s).

In some embodiments, when triggering transmission of multiple reference signal resource sets and/or reference signal resource subsets, the base station can indicate to the UE a time gap between the triggering signaling and the actual transmission of the corresponding reference signal resource set or subset. The time gap can be configured with respect to individual reference signal resource sets or subsets (e.g., the reference signal resources in a same reference signal resource set or subset are associated with a same time gap). The indication of the time gap can be achieved via signaling or predefined rules. The predefined rules for indicating the time gap can include determining the time gap based on (1) whether the L1 signaling that triggers reference signal includes corresponding spatial QCL parameter information, or (2) whether the spatial QCL parameter information in the L1 signaling is consistent with the spatial QCL parameter of a default or high level configuration.

Third Embodiment

As discussed above, a UE can determine the cell and/or BWP information corresponding to the triggered reference signal resource(s). The signaling that triggers the transmission of reference signal can also be used to trigger CSI feedback. Illustratively, a base station can notify a UE of the transmission of reference signal resource(s) and the request for CSI reporting simultaneously, by using the first and/or second signaling. Accordingly, the UE can generate corresponding CSI by measuring the triggered reference signal resources, and reports the CSI to the base station. The frequency domain resource(s) corresponding to the generated CSI can be determined in various ways.

In some embodiments, the base station uses fifth signaling to notify the UE of the cell and/or BWP information for reporting the CSI. Illustratively, the cell(s) configured for CSI reporting can be a subset of the cell(s) determined based on the reference signal configuration information, and/or, the BWP(s) configured for CSI reporting can be a subset of the BWP(s) determined based on the reference signal configuration information. In some cases, the cell(s) configured for CSI reporting is the same as the cell(s) determined based on the reference signal configuration information, and/or the BWP(s) configured for CSI reporting is the same as the BWP(s) determined based on the reference signal configuration information.

In some embodiments, the UE determines cell(s) for CSI feedback according to the cell(s) determined via the reference signal configuration information, and/or determines BWP(s) for CSI feedback according to the BWP(s) determined via the reference signal configuration information. Further, the UE can determine, according to the cell or BWP information determined based on the reference signal configuration information, (1) subband size for CSI reporting and/or (2) frequency-domain location of the subband associated with the CSI reporting.

Fourth Embodiment

When a base station transmits the reference signal, the receiving end (e.g., a UE) of the reference signal can improve reception quality of the signal by changing spatial QCL parameter(s) for signal reception. In general, the spatial QCL parameter(s) can be determined by indication(s) included in L2 control signaling or L1 control signaling, so as to adapt to the rapid change of communication channel(s). The spatial QCL parameter indication(s) can be transmitted in the same control signaling format as the control signaling that triggers reference signal. After the UE receives the indication(s) of the spatial QCL parameter(s), it can take a certain amount of time for the UE to adjust its receiving mode or function. Therefore, the time gap between the control signaling for triggering the reference signal and the actual transmission of the reference signal can be determined according to the indication(s) of the spatial QCL parameter(s).

In some embodiments, if the control signaling format of the signaling (e.g., signaling that indicates a selection of reference signal resource subset(s) and/or reference signal resource(s)) for triggering transmission of reference signal(s) does not include corresponding spatial QCL parameter(s), then the reference signal resource subset(s) and/or reference signal resource(s) are transmitted in the same time slot as the signaling for triggering the reference signal(s).

In some embodiments, if the control signaling format of the signaling for triggering the reference signal(s) includes spatial QCL parameter(s) corresponding to the reference signal resource subset(s) and/or reference signal resource(s), the UE can determine the time gap between the time slot in which the reference signal(s) is transmitted and the time slot in which the signaling that triggers the reference signal(s) is transmitted, by using predefined rules and/or based on control signaling.

Illustratively, the predefined rules can include a rule of—if the control signaling format of the signaling for triggering the reference signal(s) includes spatial QCL parameter(s) corresponding to the reference signal resource subset(s) and/or reference signal resource(s), then the reference signal(s) is transmitted in an immediate next time slot after a time slot in which the signaling that triggers the reference signal(s) is transmitted.

As for control signaling based time gap determination, illustratively, (1) indication information for the time gap between the slot in which the reference signal(s) is transmitted and the slot in which the signaling that triggers the reference signal(s) is transmitted and (2) indication information for the spatial QCL parameter(s) can be jointly indicated. In some embodiments, the joint indicating signaling includes a state indicating that QCL parameter(s) and time gap parameter(s) are nonexistent, unavailable, or absent. Illustratively, in this case, the reference signal(s) is transmitted in a slot in which the second signaling is transmitted. In some embodiments, the control signaling includes joint coding of (1) the spatial QCL parameter(s) and (2) parameter(s) indicating the time gap.

Fifth Embodiment

An individual reference signal resource or a group of reference signal resources may include multiple reference signal ports. These ports may have different transmission or reception configurations. Therefore, these ports may have different configurations of QCL parameters. Based on predefined or configured mode(s), a base station can configure different QCL parameters for different reference signal ports. Illustratively, the ports in a same group can have same QCL parameters, and the QCL parameters of different groups may be different. More specifically, N CSI-RS ports can be divided into D port groups. Ports in each group have the same QCL parameters, and QCL parameters for different groups can be respectively indicated using the following methods.

Method 1: Ports on a same symbol or symbol group are included in a same group. For example, FDM ports on a same time-domain symbol can be grouped into a same group. As another example, ports associated with a same symbol group by time-domain CDM multiplexing can be grouped into a same port group.

Method 2: Ports within a same component or component group are included in a same group. Illustratively, in a reference signal configuration, a component is a basic unit of a multi-port reference signal configuration (e.g., configuration of a 2-port or 4-port reference signal), and reference signals with more ports can be formed by aggregation of multiple components. Therefore, component can serve as a basic unit for reference signal port grouping, that is, the ports in a same component or component group are grouped into a same port group.

Method 3: Ports with port indices separated by an interval of M are grouped into a same group. Illustratively, the value of M can be determined in various ways. For example, the value of M is N/2, that is, ports separated by an interval of N/2 other ports are grouped into a same group. Further, individual port indices can be divided by N/2. If the division results in a remainder value that is smaller than a threshold T, then the corresponding port can be included in a same group. All other ports can be included in another group. As another example, the value of M is N/K, and K is the number of CDM groups included in the reference signal resource(s). Further, individual port indices can be divided by N/K. If the division results in a remainder value that is smaller than a threshold T, then the corresponding port can be included in a same group. And other ports can be grouped into another group. As yet another example, the value of M is the number of ports included in each CDM group. Alternatively or in addition, the value of M can be determined via base station signaling. For example, the value of M can be determined by associated codebook configuration parameter(s). More specifically, the value of M can be determined based on parameter(s) of port group interval(s) and/or the number of precoding vectors that are combined as indicated by codebook index.

Method 4: Ports with S consecutive port indices are grouped into a same group. For example, S can be the number of ports in a component, the number of ports in each CDM group, or the number of ports in multiple consecutive CDM groups. As another example, the value of S is N/K, and K is the number of CDM groups included in the reference signal resource(s). Alternatively or in addition, the value of S can be determined via base station signaling. For example, the value of S can be determined by associated codebook configuration parameter(s). More specifically, the value of S can be determined based on parameter(s) of port group interval(s) and/or the number of precoding vectors that are combined as indicated by codebook index.

Figure 6:
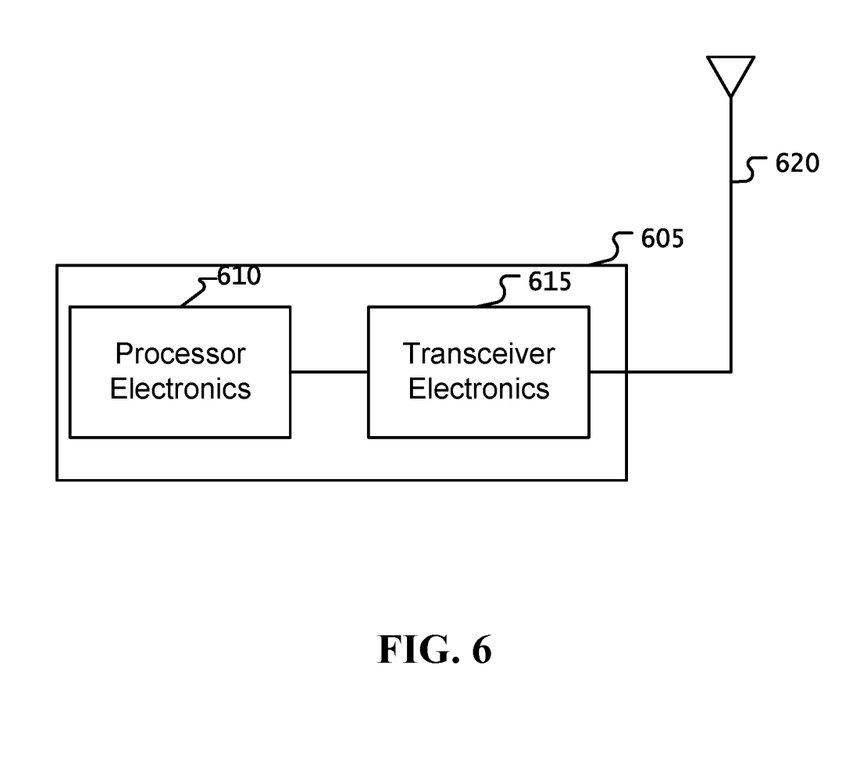
FIG. 6 is a block diagram representation of a portion of a radio station, in accordance with some embodiments of the presently disclosed technology.

FIG. 6 is a block diagram representation of a portion of a radio station, in accordance with some embodiments of the presently disclosed technology. A radio station 605, such as a base station or a wireless device (or UE), can include processor electronics 610 such as a microprocessor that implements one or more of the techniques presented in this document. The radio station 605 can include transceiver electronics 615 to send and/or receive wireless signals over one or more communication interfaces such as antenna(s) 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc., that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication comprising:
receiving, by a receiving end, a first signaling from a transmitting end that indicates a configuration of one or more sets of reference signal resources, wherein the first signaling further indicates at least one cell and at least one bandwidth part (BWP) associated with the one or more sets of reference signal resources;
receiving, by the receiving end, a second signaling from the transmitting end that indicates one cell of the at least one cell, one BWP of the at least one BWP, and a subset of the one or more sets of reference signal resources;
receiving, by the receiving end, a third signaling that indicates a selection of a target reference signal resource set from the one or more sets of reference signal resources, wherein the selection of the target reference signal resource set is from the subset of the one or more sets of reference signal resources,
wherein the target reference signal resource set is used by the transmitting end to transmit one or more channel state information (CSI) reference signals (CSI-RSs) at an end of a time gap after a time slot associated with the third signaling, the time gap being dependent on spatial quasi-co-location (QCL) information for the one or more sets of reference signal resources;
receiving, by the receiving end, the one or more CSI-RSs; and
transmitting, by the receiving end, a CSI report based on a measurement of the one or more CSI-RSs.

2. The method of claim 1, further comprising:
determining, by the receiving end, based on the at least one cell and the at least one BWP, a frequency domain location of a sub-band associated with CSI reporting.

3. The method of claim 1, further comprising:
determining, by the receiving end, a maximum bandwidth at least based on the at least one cell and the at least one BWP.

4. A method for wireless communication comprising:
transmitting, by a transmitting end, a first signaling to a receiving end that indicates a configuration of one or more sets of reference signal resources, wherein the first signaling further indicates at least one cell and at least one bandwidth part (BWP) associated with the one or more sets of reference signal resources;
transmitting, by the transmitting end, a second signaling from the transmitting end that indicates one cell of the at least one cell, one BWP of the at least one BWP, and a subset of the one or more sets of reference signal resources;
transmitting, by the transmitting end, a third signaling that indicates a selection of a target reference signal resource set from the one or more sets of reference signal resources, wherein the selection of the target reference signal resource set is from the subset of the one or more sets of reference signal resources, wherein the target reference signal resource set is used by the transmitting end to transmit one or more channel state information (CSI) reference signals (CSI-RSs) at an end of a time gap after a time slot associated with the second signaling, the time gap being dependent on spatial quasi-co-location (QCL) information for the one or more sets of reference signal resources;

transmitting, by the transmitting end, the one or more CSI-RSs; and receiving, by the transmitting end, a CSI report based on a measurement of the one or more CSI-RSs.

5. An apparatus for wireless communication comprising a processor and a memory storing instructions, execution of which by the processor causes the apparatus to:

receive a first signaling from a transmitting end that indicates a configuration of one or more sets of reference signal resources, wherein the first signaling further indicates at least one cell and at least one bandwidth part (BWP) associated with the one or more sets of reference signal resources;

receive a second signaling from the transmitting end that indicates one cell of the at least one cell, one BWP of the at least one BWP, and a subset of the one or more sets of reference signal resources;

receive a third signaling that indicates a selection of a target reference signal resource set from the one or more sets of reference signal resources, wherein the selection of the target reference signal resource set is from the subset of the one or more sets of reference signal resources, wherein the target reference signal resource set is used by the transmitting end to transmit one or more channel state information (CSI) reference signals (CSI-RSs) at an end of a time gap after a time slot associated with the second signaling, the time gap being dependent on spatial quasi-co-location (QCL) information for the one or more sets of reference signal resources;

receive the one or more CSI-RSs; and transmit a CSI report based on a measurement of the one or more CSI-RSs.

6. The apparatus of claim 5, further caused to:

determine, based on the at least one cell and the at least one BWP, a frequency domain location of a sub-band associated with CSI reporting.

7. The apparatus of claim 5, further caused to:

determine a maximum bandwidth at least based on the at least one cell and the at least one BWP.

8. An apparatus for wireless communication comprising a processor and a memory storing instructions, execution of which by the processor causes the apparatus to:

transmit a first signaling to a receiving end that indicates a configuration of one or more sets of reference signal resources, wherein the first signaling further indicates at least one cell and at least one bandwidth part (BWP) associated with the one or more sets of reference signal resources;

transmit a second signaling that indicates one cell of the at least one cell, one BWP of the at least one BWP, and a subset of the one or more sets of reference signal resources;

transmit a third signaling that indicates a selection of a target reference signal resource set from the one or more sets of reference signal resources, wherein the selection of the target reference signal resource set is from the subset of the one or more sets of reference signal resources, wherein the target reference signal resource set is used by the apparatus to transmit one or more channel state information (CSI) reference signal (CSI-RSs) at an end of a time gap after a time slot associated with the second signaling, the time gap being dependent on spatial quasi-co-location (QCL) information for the one or more sets of reference signal resources;

transmit the one or more CSI-RSs; and receive a CSI report based on a measurement of the one or more CSI-RSs.

9. The method of claim 1, wherein the time gap is configured with respect to each of the one or more sets of reference signal resources.

10. The method of claim 4, wherein the time gap is configured with respect to each of the one or more sets of reference signal resources.

11. The apparatus of claim 5, wherein the time gap is configured with respect to each of the one or more sets of reference signal resources.

12. The apparatus of claim 8, wherein the time gap is configured with respect to each of the one or more sets of reference signal resources.

* * * * *